(12) United States Patent
Contrata, Jr. et al.

(10) Patent No.: US 9,614,398 B2
(45) Date of Patent: Apr. 4, 2017

(54) CUSTOM WIRELESS RETROFITTED SOLAR POWERED PUBLIC TELEPHONE

(71) Applicant: RENEWABLE EDGE, LLC, Pomona, NY (US)

(72) Inventors: Richard C. Contrata, Jr., Harrison, NY (US); Richard C. Contrata, III, Harrison, NY (US); David J. Schaffer, Suffern, NY (US)

(73) Assignee: RENEWABLE EDGE, LLC, Pomona, NY (US)

(*) Notice: Subject to any disclaimer, the term of this patent is extended or adjusted under 35 U.S.C. 154(b) by 448 days.

(21) Appl. No.: 14/091,845

(22) Filed: Nov. 27, 2013

(65) Prior Publication Data

US 2014/0179368 A1 Jun. 26, 2014

Related U.S. Application Data

(60) Provisional application No. 61/730,730, filed on Nov. 28, 2012, provisional application No. 61/783,910, (Continued)

(51) Int. Cl.
*H04B 1/38* (2015.01)
*H02J 7/35* (2006.01)
(Continued)

(52) U.S. Cl.
CPC .............. *H02J 7/35* (2013.01); *H02J 7/025* (2013.01); *H02S 20/20* (2014.12); *H02S 40/38* (2014.12); *E04H 1/14* (2013.01)

(58) Field of Classification Search
CPC ........... H04W 8/12; H04W 4/14; H04W 4/24; H04W 88/16; H04W 8/26; H04W 12/12;
(Continued)

(56) References Cited

U.S. PATENT DOCUMENTS 4,410,930 A * 10/1983 Yachabach ................ E04H 1/14
136/291
4,441,143 A * 4/1984 Richardson, Jr. ......... E04H 1/14
136/293

(Continued)

FOREIGN PATENT DOCUMENTS

CN  2280739 Y  5/1998
CN  2406003 Y  11/2000
(Continued)

OTHER PUBLICATIONS

Henderson, "Sun Powered Pay Phones", http://www.energyharvestingjournal.com/articles/sun-powered-pay-phones-00001244.asp?sessionid=1, pp. 1-2, (Oct. 28, 2013).
(Continued)

*Primary Examiner* — Nimesh Patel
(74) *Attorney, Agent, or Firm* — The Marbury Law Group, PLLC

(57) ABSTRACT

A public telephone powered by a solar panel system and configured to transmit and receive calls over a cellular network is provided. A solar panel systems and wireless unit are retrofitted to conventional public telephones to convert them to wireless operation and to enable operations independent of the electrical grid and from the local telephone exchange.

22 Claims, 14 Drawing Sheets

Related U.S. Application Data filed on Mar. 14, 2013, provisional application No. 61/834,795, filed on Jun. 13, 2013.

(51) Int. Cl.

| | | |
|---|---|---|
| *H02J 7/02* | (2016.01) | |
| *H02S 40/38* | (2014.01) | |
| *H02S 20/20* | (2014.01) | |
| *E04H 1/14* | (2006.01) | |

(58) Field of Classification Search
CPC ... H04W 64/00; H04W 64/003; H04W 16/00; H04W 48/04; H04W 84/042; H04W 40/20; H04W 88/02; H04W 4/023; H04W 4/206; H04W 4/027; H04W 52/0209; G06Q 20/20; G06Q 30/0267; G06Q 10/087; G06Q 30/0241; G06Q 30/02; G06Q 30/0251; G06Q 30/0261; G06Q 30/0204; G06Q 30/0255; G06Q 30/00; Y02E 10/50; Y02E 10/47; Y02E 10/541; Y02E 10/563; Y02E 40/72; Y02E 10/40; Y02E 10/544; H02S 20/00; H02S 30/20; H02S 20/25; H02S 20/22; H02S 20/30; H02S 40/38; Y02B 10/12; Y02B 10/20; Y02B 20/72; H04M 1/72561; H04M 1/72569; H04M 1/07
See application file for complete search history.

(56) References Cited

U.S. PATENT DOCUMENTS

| | | | |
|---|---|---|---|
| 5,046,085 A | 9/1991 | Godsey et al. | |
| 5,272,747 A | 12/1993 | Meads | |
| 6,256,518 B1* | 7/2001 | Buhrmann | H04M 19/08 455/422.1 |
| 6,320,946 B1 | 11/2001 | Enzmann et al. | |
| 6,480,590 B1 | 11/2002 | Ku | |
| 6,870,089 B1* | 3/2005 | Gray | H01L 31/042 136/200 |
| 7,397,907 B2 | 7/2008 | Petite | |
| 7,459,320 B2 | 12/2008 | Martinotto et al. | |
| 7,720,468 B1* | 5/2010 | Hong | H04W 24/10 370/242 |
| 2002/0005821 A1* | 1/2002 | Park | G06Q 30/02 345/30 |
| 2002/0098826 A1 | 7/2002 | Wakil et al. | |
| 2002/0166127 A1* | 11/2002 | Hamano | G06Q 30/02 725/105 |
| 2002/0197989 A1 | 12/2002 | Cruder et al. | |
| 2007/0263858 A1 | 11/2007 | Kemp | |
| 2009/0197619 A1* | 8/2009 | Colligan | G06Q 30/02 455/456.3 |
| 2012/0129577 A1* | 5/2012 | Vaknin | H02J 7/0027 455/573 |

FOREIGN PATENT DOCUMENTS

| | | |
|---|---|---|
| CN | 2417239 Y | 1/2001 |
| CN | 2473279 Y | 1/2002 |
| CN | 2565899 Y | 8/2003 |
| CN | 2755225 Y | 2/2006 |
| CN | 201620620 U | 11/2010 |
| CN | 102140853 A | 8/2011 |
| CN | 202090623 U | 12/2011 |
| CN | 202431026 U | 9/2012 |
| CN | 202831690 U | 3/2013 |
| CN | 202972895 U | 6/2013 |
| ES | 2105966 A1 | 10/1997 |
| GB | 2357176 A | 6/2001 |
| JP | 06-015088 U | 2/1994 |
| JP | 07-041808 Y2 | 9/1995 |
| KR | 20-2010-0004048 U | 4/2010 |
| KR | 10-2010-0132219 A | 12/2010 |
| WO | 0195605 A1 | 12/2001 |
| WO | 0229181 A1 | 4/2002 |
| WO | 2006099708 A1 | 9/2006 |

OTHER PUBLICATIONS

Hightechstore, "GSM Outdoor Wireless Solar-Powered Cellular Payphone & Booth", http://www.thehightechstore.com/solarpaypower.htm, pp. 1-3, (Oct. 28, 2013).

Musibay, "Pay Phones make a comback in Miami with high-tech twist", http://www.bizjournals.com/southflorida/stories/2010/10/11/story9.html?page=all, pp. 1-5, (Oct. 11, 2010).

Telemo, "Solar payphones already in the streets", http://www.renewableenergymagazine.com/article/solar-payphones-already-in-the-streets, pp. 1-2, (Oct. 28, 2013).

Wright, "Reaching out to remote and rural areas", Telecommunications Policy, vol. 19, No. 2, pp. 105-116, (1995).

International Search Report from the International Searching Authority in International Application No. PCT/US2013/072226 dated Mar. 20, 2014.

International Preliminary Report on Patentability (Chapter 1 of the Patent Cooperation Treaty) in International Application No. PCT/US2013/07226 dated Jun. 11, 2015.

\* cited by examiner

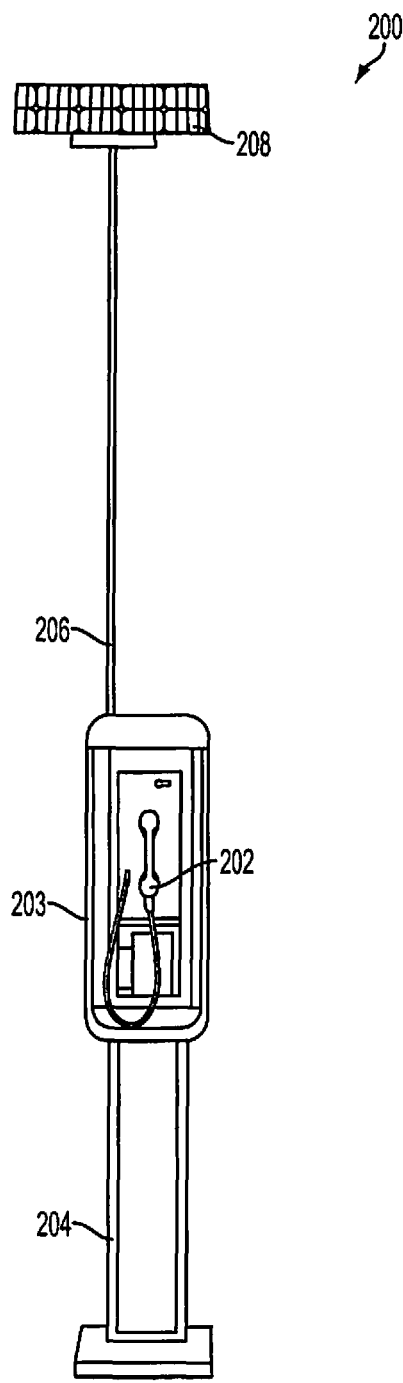
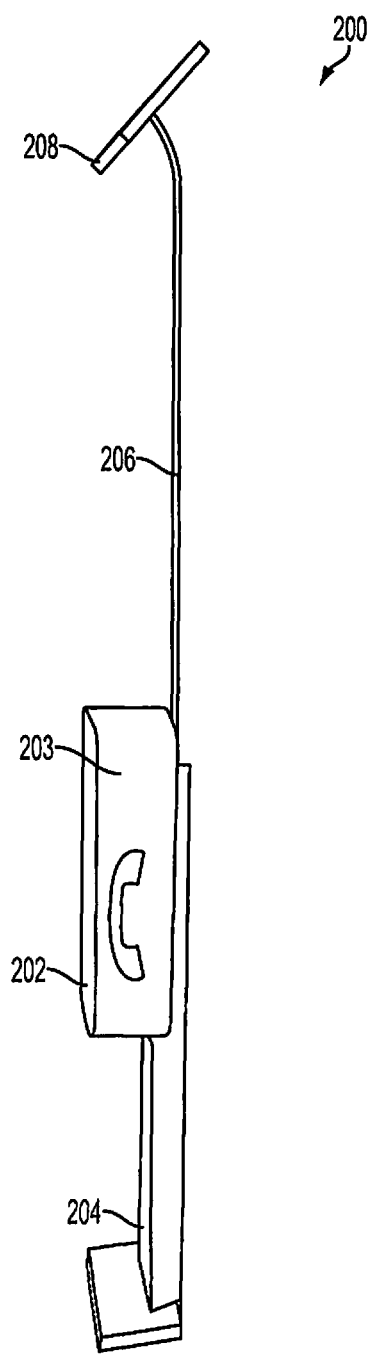
FIG. 2A
FIG. 2B

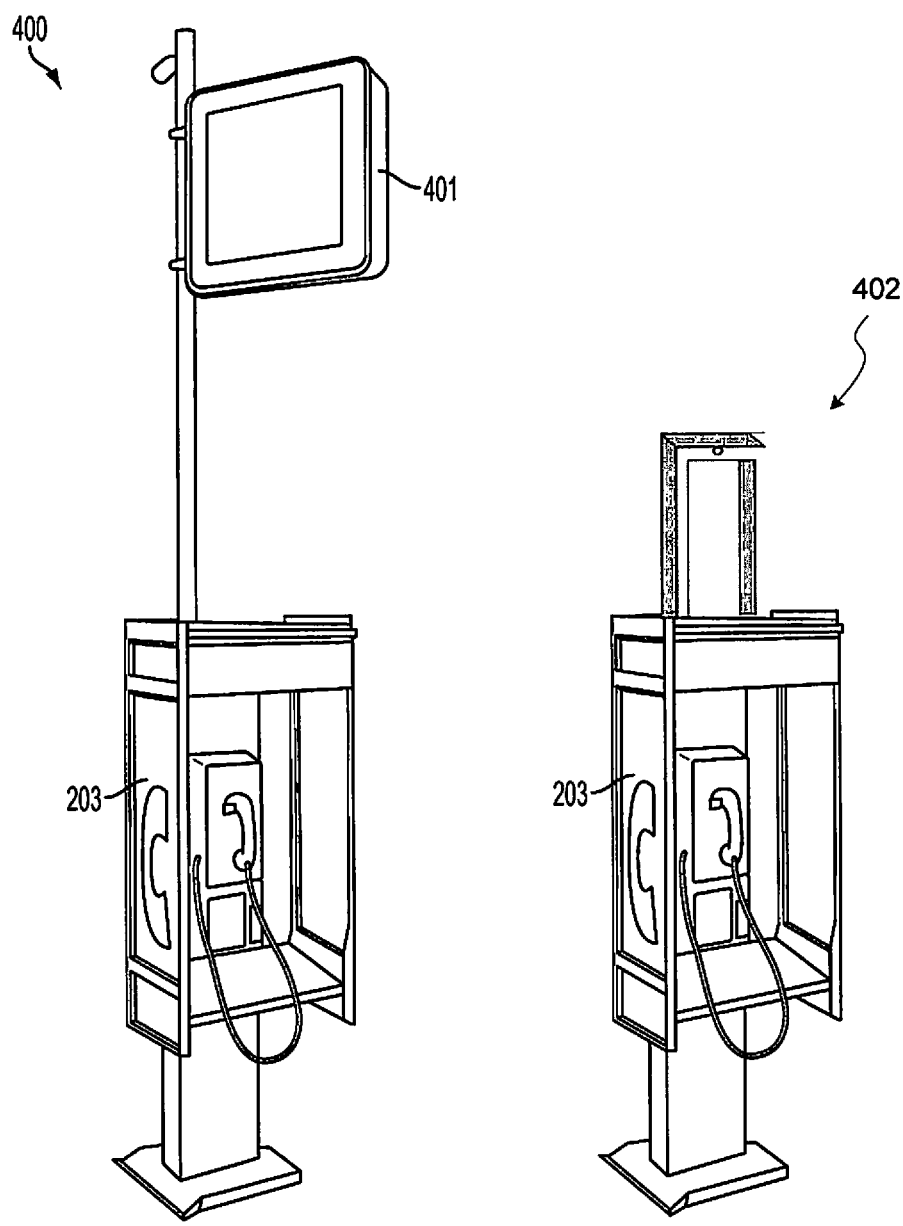
FIG. 4A   FIG. 4B

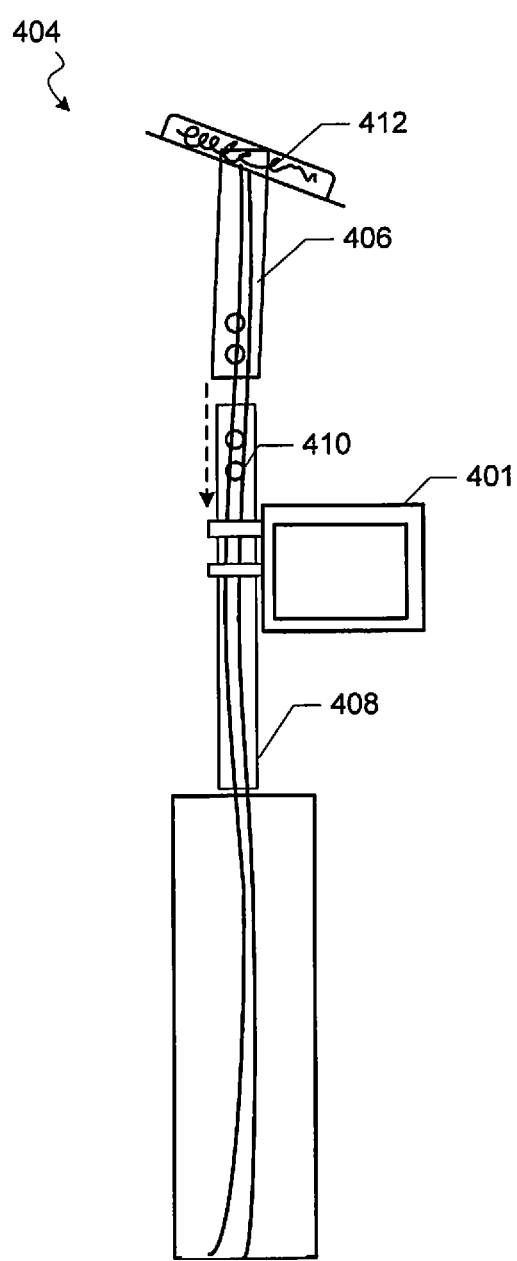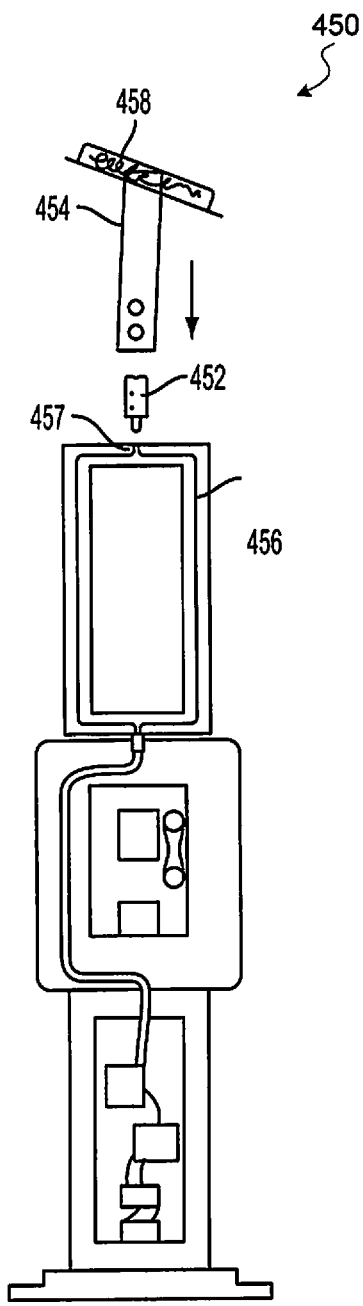
FIG. 4C  FIG. 4D

CUSTOM WIRELESS RETROFITTED SOLAR POWERED PUBLIC TELEPHONE

RELATED APPLICATIONS

This patent application claims the benefit of priority to U.S. Provisional Patent Application Ser. No. 61/730,730 filed on Nov. 28, 2012, U.S. Provisional Patent Application Ser. No. 61/783,910 filed on Mar. 14, 2013, and 61/834,795 filed on Jun. 13, 2013, the contents of which are hereby incorporated by reference in their entireties.

FIELD OF THE INVENTION

The various embodiments relate generally to public telephones, and more particularly to efficiently powering public telephones.

BACKGROUND

Public telephones, such as public payphones, have become increasingly obsolete due to advances in technology and the proliferation of numerous telephony options for customers. Because public telephones are stationary, but were generally built prior to development of many existing technologies, operators have not been able to take advantage of potential cost savings. For example, most public telephones still in existence are connected via landlines of local telephone exchanges, and use power delivered by the electrical grid operated by the local utility.

SUMMARY

The various embodiments illustrated herein provide devices and methods for retrofitting existing public telephones with solar panel systems, thereby removing the need for energy consumption from the local power utility. In an embodiment, a method of retrofitting a solar panel system to provide power to public telephone includes: mounting a wireless unit in a payphone having a pedestal, wherein the wireless unit is configured with a registered jack (RJ), a transceiver, and a UICC on which a subscriber identity module (SIM) is stored; disconnecting a telephone landline from the public telephone; connecting a first end of a two-wire modular connector to a line interface in the public telephone; connecting a second end of the two-wire modular connector to the registered jack of the wireless unit; and programming the SIM in the wireless unit to access a cellular network base station.

In another embodiment, the method of retrofitting a solar panel system to provide power to public telephone further includes configuring the public telephone to access a wireless communications network by performing steps, including: mounting a wireless unit in the pedestal, wherein the wireless unit is configured with a registered jack, a transceiver, and a UICC on which a subscriber identity module (SIM) is stored; disconnecting a telephone landline from the public telephone; connecting a first end of a two-wire modular connector to a line interface in the public telephone; connecting a second end of the two-wire modular connector to the registered jack of the wireless unit; and programming the SIM in the wireless unit to access a cellular network base station.

In another embodiment, the method of retrofitting a solar panel system to provide power to a public telephone includes mounting a charge controller in the public telephone; mounting a battery unit in the public telephone, in which the battery unit is connected to the charge controller; attaching a flexible solar panel to an outer surface of a surrounding enclosure that houses a handset of the public telephone, in which the flexible solar panel is configured to be substantially flat against the outer surface; and connecting the flexible solar panel to existing wiring in the pedestal of the public telephone and to the charge controller thereby allowing a battery to be charged via conversion of solar energy to electrical energy.

BRIEF DESCRIPTION OF THE DRAWINGS

The accompanying drawings, which are incorporated herein and constitute part of this specification, illustrate exemplary aspects of the invention. Together with the general description given above and the detailed description given below, the drawings serve to explain features of the invention.

FIGS. 2A and 2B are elevation views of an embodiment solar panel system retrofitted public telephone.

FIGS. 4A and 4B are elevation views of respective single- and double-mast public telephones suitable for use with alternative embodiments.

FIGS. 4C and 4D are side views of respective embodiment solar panel mounting systems in solar panel system retrofitted single- and double-mast public telephones.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "public telephone" is used herein to refer to a pay telephone or any other telephone that is generally available at various publically-accessible locations. Public telephones may be provided within stand-alone units, mounted to sides of buildings or other structures, or in a variety of other configurations.

The terms "conventional public telephone" and "fixed-line public telephone" are used herein to refer to a public telephone on which telephone calls are placed via a landline that connects to a telephone company central office or PBX.

The term "landline" is used herein to refer to a telephone connection that uses a solid medium telephone line such as a metal wire or fiber optic cable for transmission.

The term "wireless" is used herein to refer to a device that can make and receive telephone calls over a radio link by connecting to a cellular network provided by a mobile phone operator.

The term "solar panel" as used herein means a photovoltaic panel that can be used to convert light into energy.

The various embodiments provide public telephones that are powered by solar energy, and that are configured to make and receive telephone calls over a wireless communications network. In this manner, a public telephone may be removed from the power grid and from landline telephone exchanges.

The various embodiments illustrated herein relate to retrofitting conventional public telephones with equipment that allows disconnecting from the electrical grid and from landline telephone exchanges. In particular, the various embodiments provide methods of configuring a public telephone with a solar panel system that powers the telephone without requiring an additional power source. The various embodiments also provide methods of configuring a public telephone to transmit and receive calls over cellular networks. The methods and systems of the various embodiments include customizing solar panel and wireless communications equipment to fit individual existing public telephones.

Figure 1:
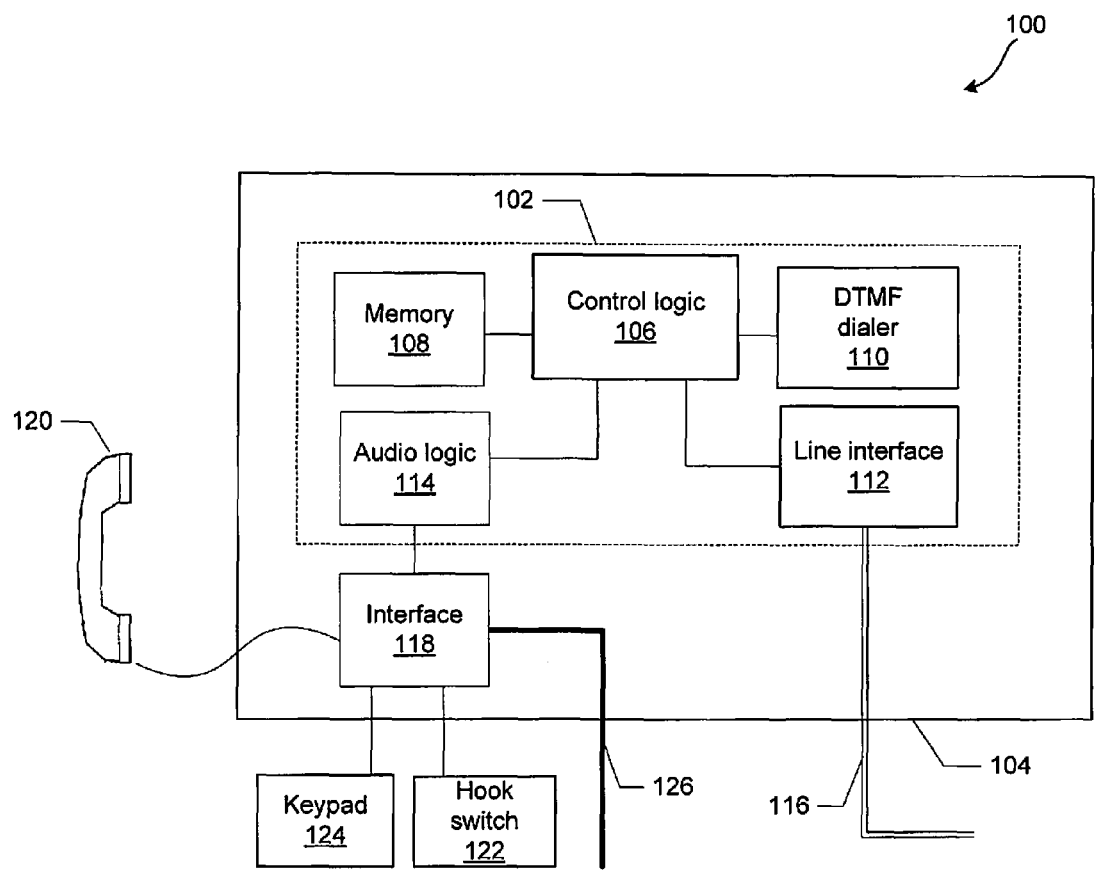
FIG. 1 is a component block diagram of a public telephone suitable for use with the various embodiments.

FIG. 1 illustrates components of an example conventional public telephone 100. A public telephone 100 may include circuitry 102 disposed within a housing 104. Circuitry 102, which may be implemented on a circuit board, may include control logic 106 coupled to a memory device 108, a DTMF (dual tone multi-frequency) dialer 110, a line interface 112, and audio logic 114. The line interface 112 may connect a telephone landline 116, which may connect to a telephone company central office or, alternatively, to a PBX. Other components within the housing 104 may include one or more interfaces 118 that connect external components, for example, a handset 120 with a speaker and microphone, a hook switch 122, and a keypad 124. Further, an interface 118 may connect to a power cord 126 that extends from the housing to connect the public telephone to a local power source.

FIGS. 2A and 2B illustrate front and side views, respectively, of a public telephone configured with a solar panel system according to the various embodiments. A solar-powered public telephone 200 may be, for example, a fixed-line public telephone or may be a wireless public telephone. In an embodiment, the solar-powered public telephone 200 may include a telephone component 202, a surrounding enclosure 203, and a pedestal 204, to which a solar panel system may be retrofitted. In an embodiment, the solar panel system may include a mounting pole 206, a solar panel 208, and rechargeable battery and controller components within the pedestal 204, discussed in further detail below.

Figure 2C:
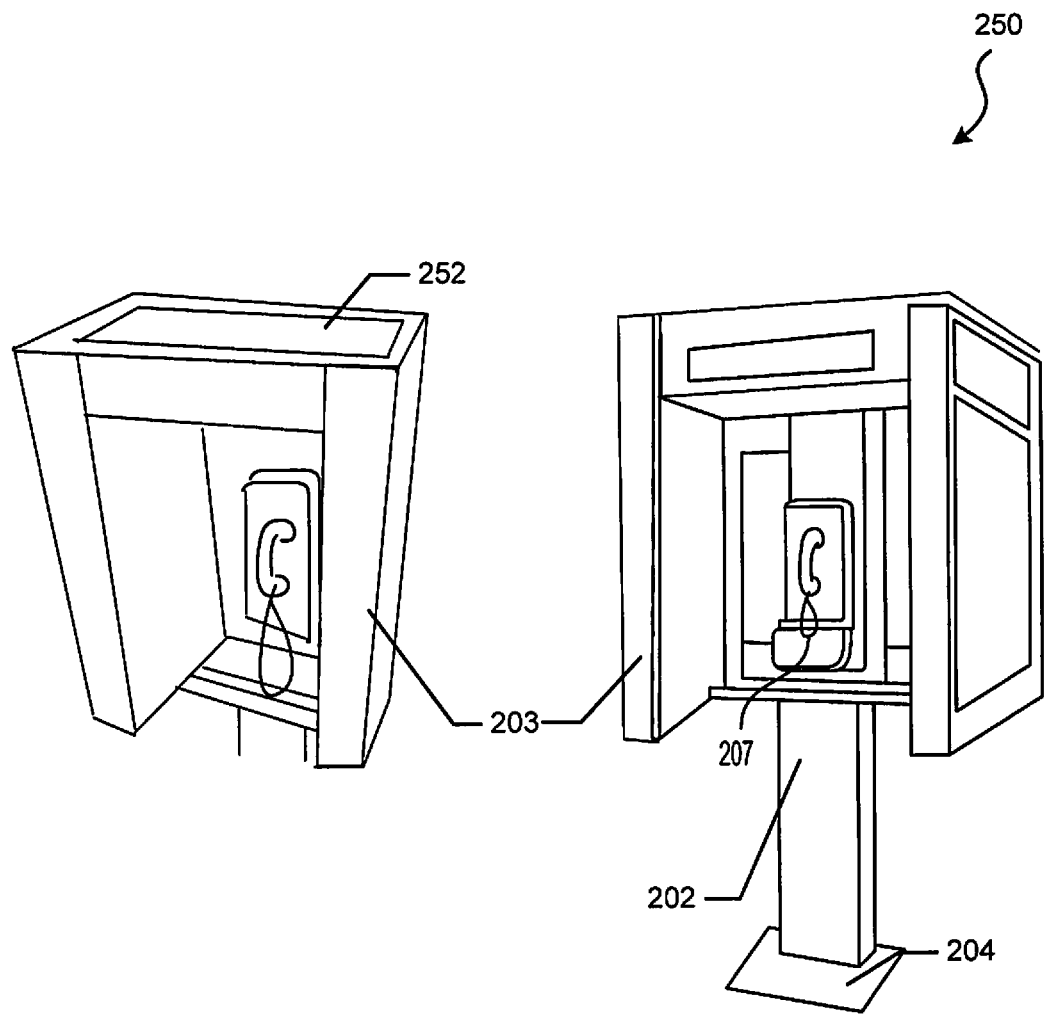
FIGS. 2C and 2D are elevation views of alternative embodiments of solar panel system retrofitted public telephones.

FIG. 2C illustrates two views of a solar panel system according to an alternative embodiment. A solar-powered public telephone 250 may include a telephone component 202, a pedestal 204, and a surrounding enclosure 203 to which a solar panel system may be retrofitted. In this embodiment, the solar panel system may include a flexible solar panel 252 mounted directly to the top of the surrounding enclosure 203, and rechargeable battery and controller components within the pedestal 204.

Figure 2D:
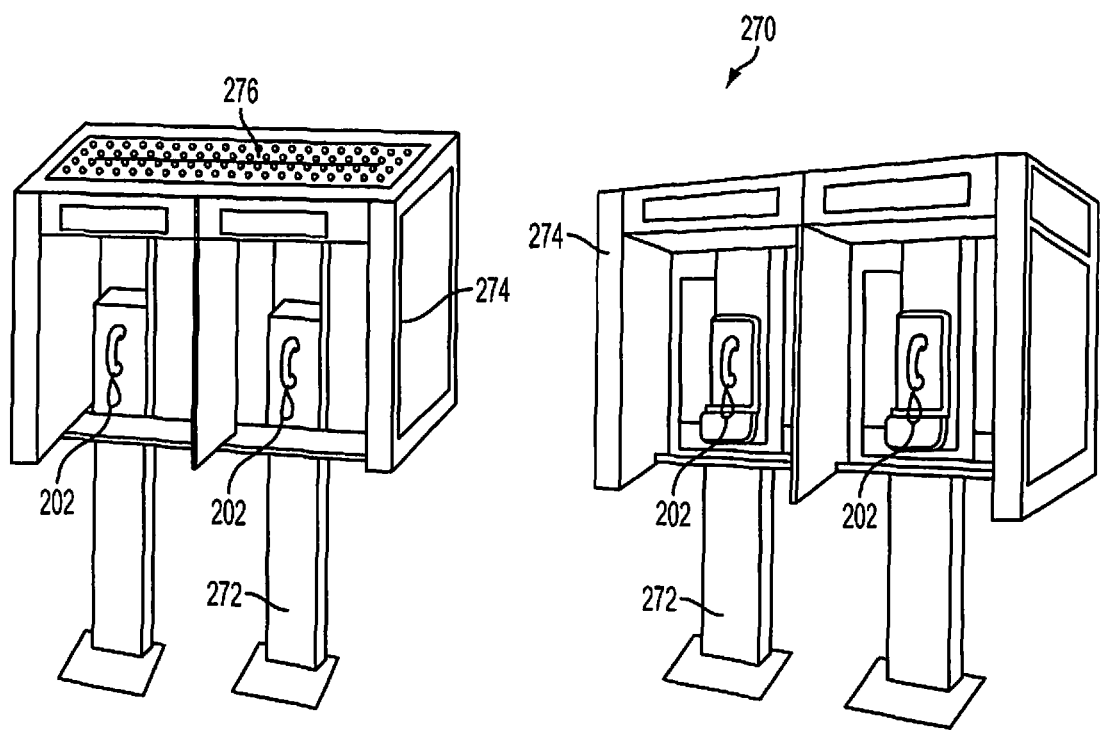

Other embodiment solar-powered public telephones 250 with flexible solar panels 252 may include multiple telephones within a single surrounding enclosure. FIG. 2D shows two views of an example of a multi-phone solar panel system according to such an embodiment. The solar powered multi-phone system 270 may include a plurality of telephone components, such as two telephone components 202. The solar powered multi-phone system 270 may also include one or more pedestal 272, and a surrounding enclosure 274 configured to house both telephone components 202, to which a solar panel system may be retrofitted. In this embodiment, the solar panel system may include a flexible solar panel 276 that may be similar to, but larger than, the flexible solar panel 252 discussed above with respect to FIG. 2C.

Figure 2E:
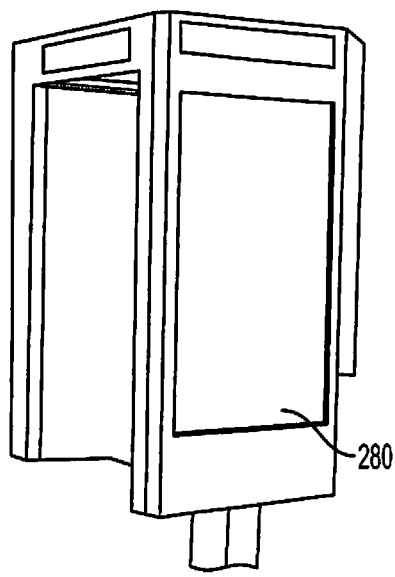
FIGS. 2E and 2F are elevation views of embodiment solar panel system retrofitted public telephones configured with LED advertising panels.
Figure 2F:
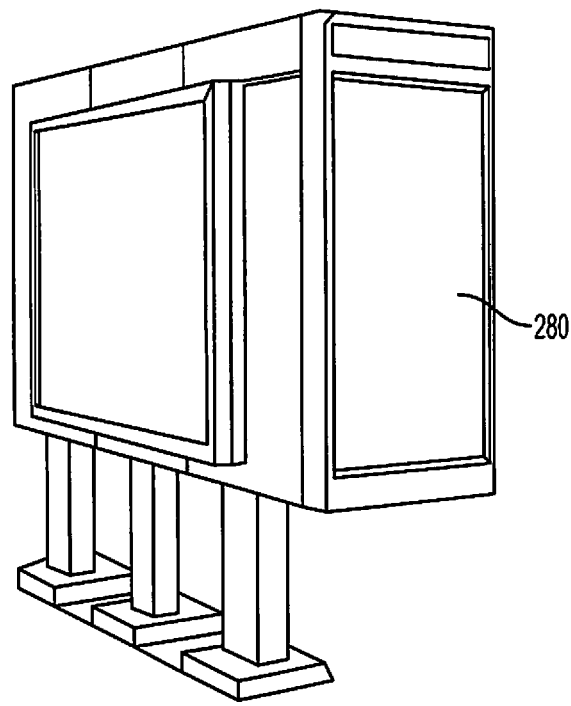

In another embodiment, the exterior of the pedestal(s), and/or the interior or exterior of the surrounding enclosure, may be configured with various electronic advertising display media on the front, back, and/or sides of the pedestal housing. In this embodiment, the solar panel may be capable of producing sufficient output energy to power both the public telephone and the advertising display media. Such advertisement display may be presented on panels using LED technology, such as LED-backlit LCD displays. FIGS. 2E and 2F illustrate examples of LED advertising panels 280 applied to the solar-powered public telephone shown in FIG. 2C and the solar-powered multi-phone system shown in FIG. 2D, respectively. The LED advertising displays 280 may be implemented using rechargeable batteries and a charge controller according to techniques that are known to persons of ordinary skill in the art.

In another embodiment, the LED advertising display unit may be a fully digital advertising display unit that uses a digital advertising message box for content. The digital advertising message box may be controlled by a remote computer over a network interface, such as a wireless broadband internet connection and/or cellular connection on the telephone unit. For example, a remote computer system to which the digital advertising message box connects may implement scheduling software that may automatically change content on one or more digital advertising display unit. Content may be provided to the digital advertising message box by transmission of a file or file location, such as an internet protocol address, from the remote computer system. In an embodiment, one or more digital advertising display units may replace traditional back-lit displays on the front, back, and/or sides of the pedestal housing or surrounding enclosure. The digital advertising display unit may allow the capability to provide static slides, scrolling text, live video, and/or animation sequences. Other capabilities that may be provided by the digital advertising display unit include, but are not limited to, interactive features (e.g., via a touch screen or voice commands), and customized advertisement applications that may provide maps and local points of interest to users.

In various embodiments, retrofitting a digital advertising display unit to a solar powered public telephone may involve removing existing fluorescent light bulbs (e.g., compact fluorescent tubes) from the interior of traditional advertising panels, such as those that form the surrounding enclosure, and replacing them with LED fixtures. In some embodiments, the interior of one or more panels in a digital advertising display unit may be configured with reflective tape to expand the illumination generated by the LED lighting system without increasing the wattage and amperage.

In another embodiment, a solar-powered public telephone may also be configured with a charging unit to allow a user to charge portable battery electronic devices (e.g., cellular phone, MP3 player, etc.). For example, the interior of the surrounding enclosure may be configured with one or more port, such as a universal serial bus (USB) port, which may accept a USB cable provided by the user for temporary charging.

Figure 3A:
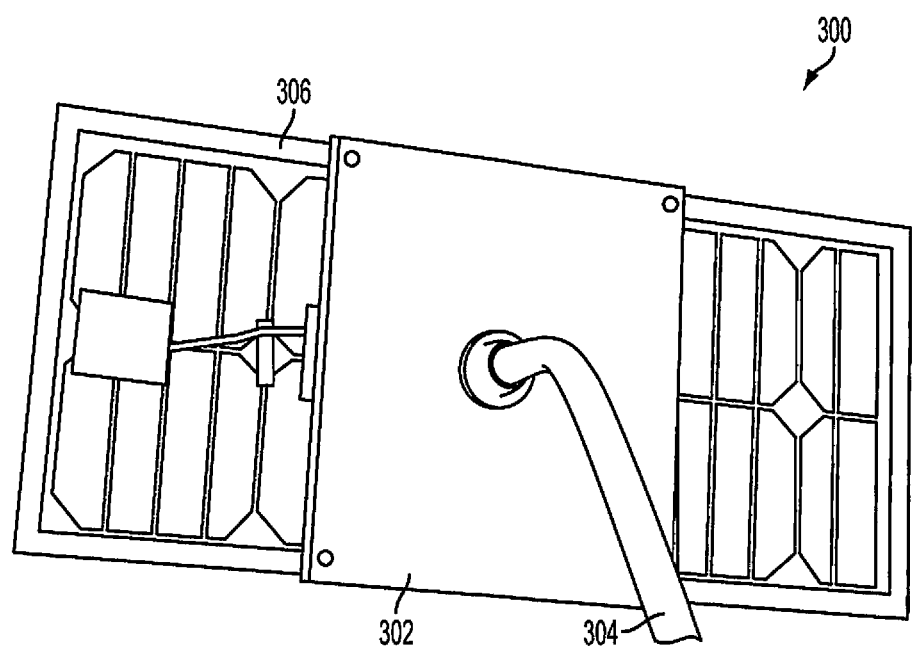
FIG. 3A is an elevation view of an embodiment solar panel mounting system in a solar panel system retrofitted public telephone.

In the various embodiments, a customized pre-wired mounting system may be provided to attach the solar panel 208 to the mounting pole 206 in FIGS. 2A and 2B. The parts of an example mounting system are illustrated in FIG. 3A.

In an embodiment, a mounting system 300 may be a mounting bracket 302. For example, a mounting bracket may be formed with a metal plate attached to a compression connector. In an example, the compression connector may be a standard ½ inch conduit compression connector, and the metal may be flat plate aluminum or steel with a ⅞ inch center hole to attach to the compression connector.

A mounting pole 304 may be connected to the mounting bracket 302 by attaching to the compression connector at one end. In an embodiment, a washer may be inserted between the metal plate and the compression connector to increase the rigidity of the connection point of the mounting pole. In an embodiment, the mounting pole 304 may be made of rigid metal that is ½ inch in diameter. In an embodiment, the mounting pole 304 may be around five feet long, and may be bent to an angle of approximately 23 degrees, which provides the optimum southern exposure for maximum year-round solar panel efficiency for the Northeast United States. In another embodiment, the angle of tilt may be customized to obtain an optimal angle of inclination for solar panels, depending on the geographic area and location of the public telephone.

A solar panel 306 may be mounted to the mounting bracket 302 using one-way security screws, and may be attached to the mounting pole 304 via the compression connector. The solar panel 306 may be, for example, a 20 watt, 12 volt solar panel. In an embodiment, wiring from the solar panel 306 may connect to a charge controller in the pedestal body. The mounting pole 304 may serve as a raceway to run the wiring down into the pedestal body cavity. In this manner, no wiring is exposed. In an embodiment, the azimuth of the solar panel 306 may be adjustable a full 360 degrees by tightening down or loosening the mounting pole 304 in the pedestal body.

Figure 3B:
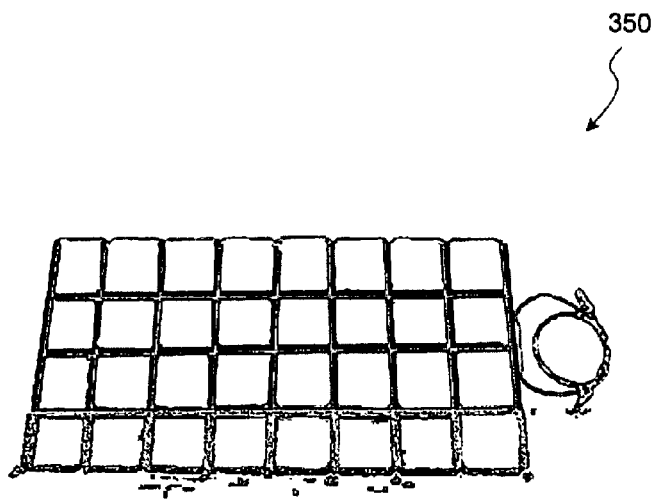
FIG. 3B and 3C are elevation views of embodiment flexible solar panels for use in the solar panel system retrofitted public telephones of FIGS. 2C and 2D, respectively.

In other embodiments that do not utilize a mounting pole, such as those illustrated in FIGS. 2C and 2D above, a flexible solar panel may be mounted to the top surface of surrounding enclosures that surround a telephone such that the solar panel lies substantially flat against the top surface thereby concealing its presence from the casual view of pedestrians or those using the public telephone. A flexible solar panel that is suitable for use in the solar-powered public telephone 250, discussed above with respect to FIG. 2C, is illustrated in FIG. 3B.

In an embodiment, a flexible solar panel 350 may be a 30 watt pre-wired, frameless, glass-free solar flex panel that is capable of bending to an arc angle of up to around 30 degrees. In other alternative embodiments, the flexible solar panels may be installed so that they are angled to take advantage of the sun's angle of illumination. In an embodiment, the flexible solar panel 350 may be a frameless panel constructed by laminating monocrystalline or polycrystalline cells onto a thin plastic film. The flexible solar panel may be about 3 mm thick in the various embodiments.

Figure 3C:
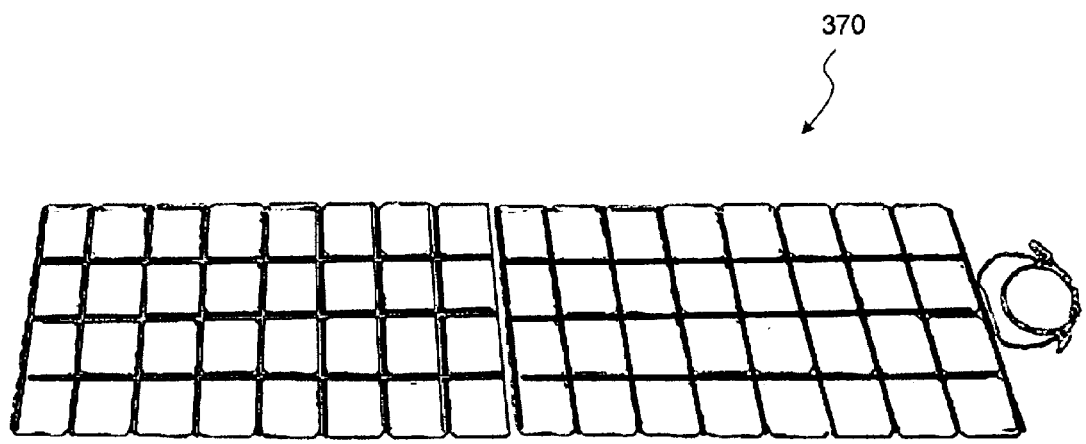
Figure 3D:
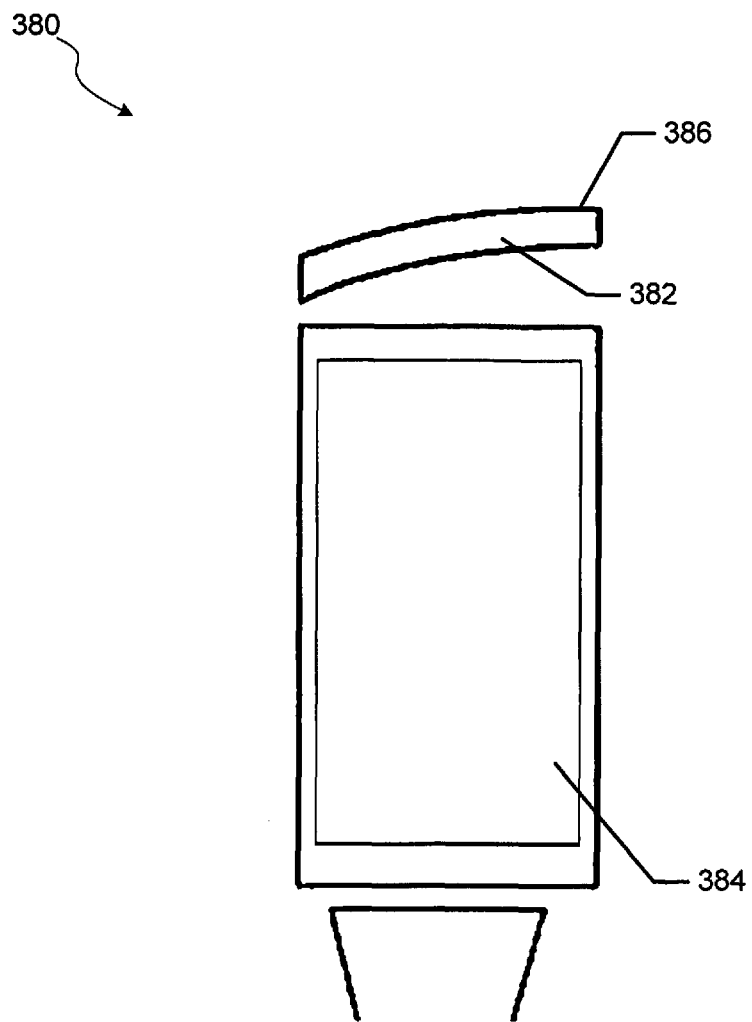
FIG. 3D is an elevation view of an alternative embodiment solar panel system retrofitted public telephone.

FIG. 3C illustrates a suitable flexible solar panel 370 for use in a solar powered multi-phone system, such as system 270 discussed above with respect to FIG. 2D. In the various embodiments, flexible solar panel 370 may have about twice the area of flexible solar panel 350. In an example embodiment, flexible solar panel 370 may be pre-formed. In another example embodiment, flexible solar panel 370 comprises two flexible solar panels 350 that are joined together at the point of installation. Flexible solar panels in a plurality of different sizes may also be made available, for example, for use in solar-powered multi-phone systems may house more than two telephone components, and may have a larger surrounding enclosure. In one embodiment, flexible solar panels 350, 370 may be attached to the top surface of a surrounding enclosure using stainless steel security bolts and strain relief wire connectors. In another embodiment, flexible solar panels 350, 370 may be attached to the top surface of a surrounding enclosure by drilling security screws through customized grommets on border of panel, thereby avoiding penetrating the panel which may void a manufacturer's warranty Due to the bendable characteristic of the flexible solar panels 350, 370, embodiment solar power systems may be configured to fit a variety of different shaped surrounding enclosures. For example, FIG. 3D illustrates an embodiment solar-powered public telephone 380 with a curved top surface 382 on the surrounding enclosure 384. A flexible solar panel 386 may be mounted on the top surface 382, remaining flat against the surface in spite of its curve. These characteristics of the flexible solar panel 386 may provide additional security from theft or tampering. That is, when mounted on the top surface 382 of the surrounding enclosure, the thickness of only around 3 mm and ability to bend hides the flexible solar panel 386 from visibility of pedestrians at street level.

In an alternative embodiment, a solar panel system may be retrofitted to a public telephone that is configured with an existing single- or double-mast. FIG. 4A illustrates an example single-mast public telephone 400, and FIG. 4B illustrates an example double-mast public telephone 402. Such single-mast or double-mast configurations may be in existence, for example, to display signs and/or advertisements on top of the surrounding enclosure 203, such as sign 401.

FIG. 4C illustrates a side view of a solar panel system 404 configured to retrofit a single-mast public telephone 400. A sleeve mounting pole 406 may be sized such that it forms a sleeve that slides over the top of the existing mast 408. The sleeve mounting pole 406 may be affixed to the existing mast 408 through holes 410 using fasteners known in the art. Example fasteners may include, but are not limited to, bolts, sheet metal screws, laq screws, rivets, etc. Components to attach a solar panel 412 to the sleeve mounting pole 406 may be substantially the same as those described above with respect to FIG. 3A.

FIG. 4D illustrates a side view of a solar panel system 450 configured to retrofit a double-mast public telephone 402. In an embodiment, a mounting pole may consist of a bracket portion 452 and a sleeve portion 454. In an embodiment, existing wiring in the public telephone may run up the two sides of the double-mast 456, and may come together to exit a hole 457 at the top of the double-mast 456. The bracket portion 452 may be secured to the double-mast 456 through the exit hole 457. In one example, a hollow threaded fastener portion may attach the bracket portion 452 to the double-mast 456 while guiding the wiring through the bracket portion 452. A sleeve portion 454 may form a seal over the top of the bracket portion 452, and may be secured to the bracket portion 452 with fasteners though the portion forming the seal. Example fasteners may include, but are not limited to, bolts, sheet metal screws, laq screws, rivets, etc. Components to attach a solar panel 458 to the sleeve portion 454 of the mounting pole may be substantially the same as those described above with respect to FIG. 3A.

Figure 4E:
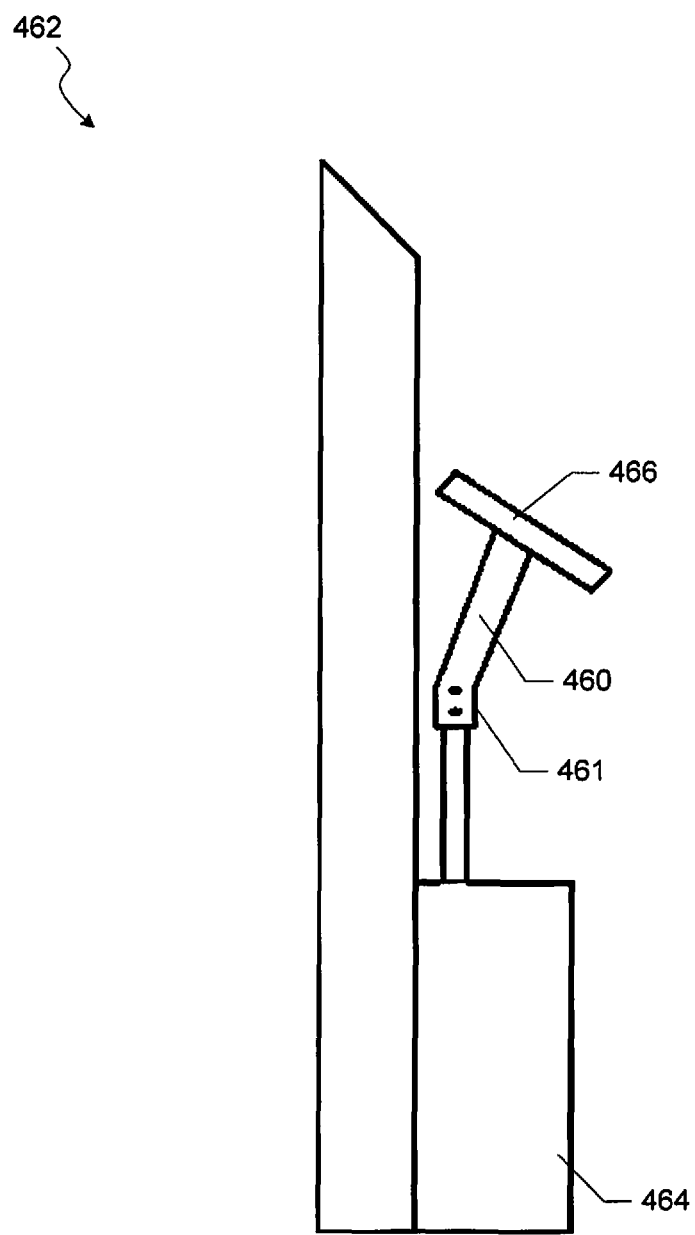
FIG. 4E is a side view of an embodiment solar panel mounting system in a solar panel system retrofitted wall-mounted public telephone.

In another alternative embodiment, a solar panel system may be retrofitted to a single or double-mast public telephone when the public telephone is mounted against a wall or other vertical surface such that there is insufficient clearance for the upright configuration. FIG. 4E illustrates a side view of an offset mounting pole 460 that may be a component in a solar panel system 462 configured to retrofit a wall-mounted public telephone 464. In other embodiments, the offset mounting pole 460 may be used to retrofit a single-mast or double-mast public telephones as well (not shown). For example, offset mounting pole may replace the sleeve mounting pole in the solar panel system 404 shown in FIG. 4C, and/or an offset bracket portion 461 may replace the bracket portion 452 in solar panel system 450 shown in FIG. 4D. The offset bracket may have a permanent fixed elbow portion providing for an angular mounting of the associated solar panel 466, or may comprise a hinged joint to allow an offset angle to be adjustably set during installation.

Figure 5A:
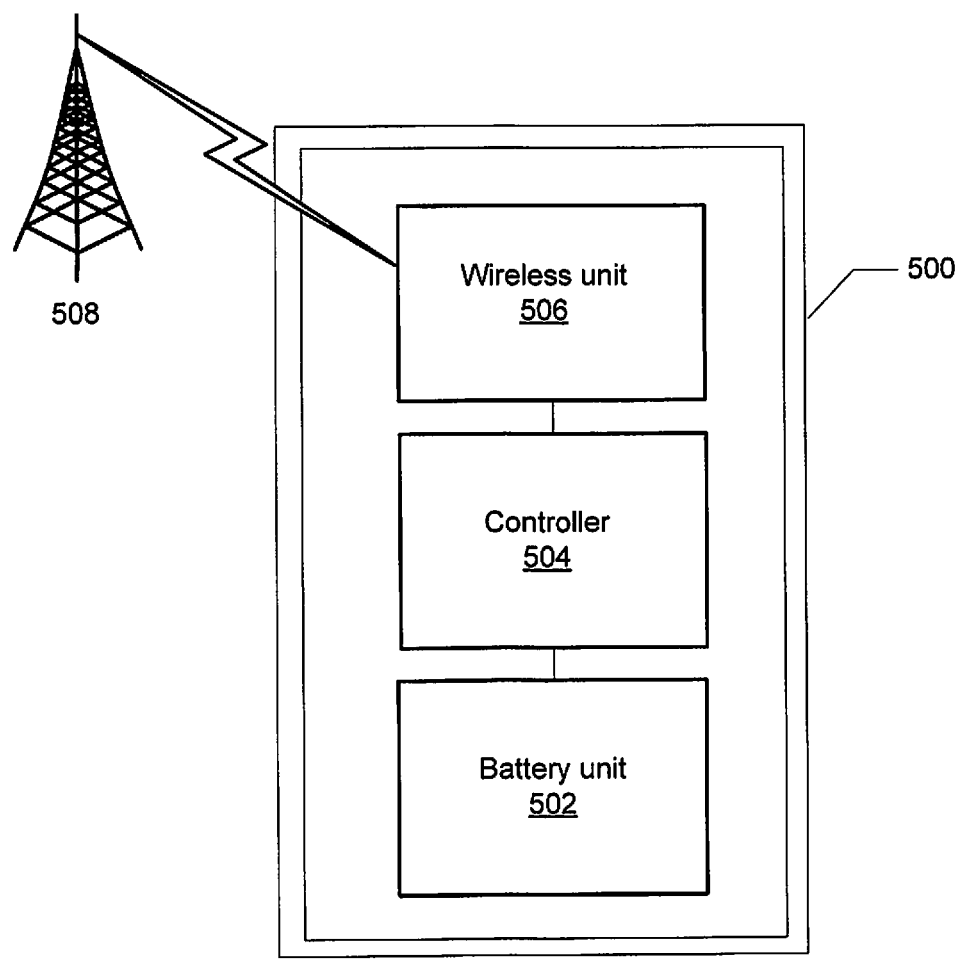
FIG. 5A is a component block diagram of an embodiment solar panel system retrofitted public telephone.

FIG. 5A illustrates the components of an embodiment solar-powered public telephone that may be housed within a pedestal. Pedestal 500 may contain a battery unit 502, a charge controller 504, and a wireless unit 506.

The charge controller 504 and wireless unit 506 may be mounted to the inside of the pedestal 500 via a custom-cut mounting block. For example, the mounting block may be made of plywood. In one embodiment, the mounting block may be 4×4 inches to fit most pedestals. However since pedestals come in different sizes and have different amounts of interior space, the size of the mounting block may be configured to fit the particular pedestal that is going to be retrofitted.

The wireless unit 506 may be configured to access any of a number of cellular networks, depending on the particular area and operator selection. For example, the wireless unit may have a universal integrated circuit card (UICC) configured with a subscriber identity module (SIM). The SIM may be programmed to access, for example, a GSM network, CDMA network, etc. The wireless unit 506 may contain various components, such as a baseband processor and transceiver, which enable it to access a base station 408 of a cellular network over an air interface.

As discussed above with respect to FIGS. 2E and 2F, the solar-powered public telephone may include one or more digital advertising display unit. In one such embodiment, a dual-use charge controller may be provided to regulate charge from one or more shared batteries to both the telephone unit and the LED lighting of the one or more digital advertising display unit.

Figure 5B:
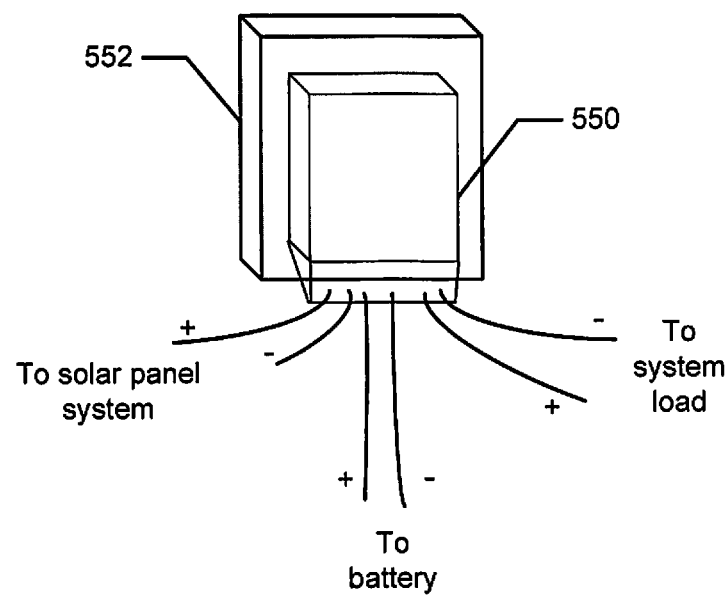
FIG. 5B is an elevation view of a dual-use charge controller suitable for use in some embodiment solar panel system retrofitted public telephones.

FIG. 5B illustrates an example dual-use charge controller 550. The dual-use charge controller 550 may be configured with a set of lead wires to connect to one or more rechargeable battery, a set of lead wires to connect to the solar panel system, and a set of lead wires to connect the system load. The set of lead wires to connect the system load may be split into two separate sets (not shown), with one of the load set of lead wires to connect to the wireless unit of the telephone, and the other set of lead wires to connect to the LED lighting. Further, the wiring from the dual-use charge controller 550 that connects to the LED lighting may include an intelligent circuit of a photocell (i.e., a photoresistor) and a combination of resistors. The photocell intelligent circuit may allow the dual-use charge controller 550 to operate such that the LED lighting is dim or turned off when exposed to incident light above a certain threshold, and is illuminated when exposed to a low amount of incident light. In alternative embodiments, depending on possible limitations of the solar exposure at any given geographical location, a programmable digital or analogue timer may be used instead of a photocell intelligent circuit. Such programmable timer may allow for increased efficiency and better management of the LED lighting power usage.

The dual-use charge controller 550 may be enclosed in a plastic weatherproof case 552 to protect the internal electronics of the controller from water, dust and other airborne debris. The dual-use charge controller 550 may be mounted inside the weatherproof case 552 using double sided industrial grade adhesive tape.

Figure 5C:
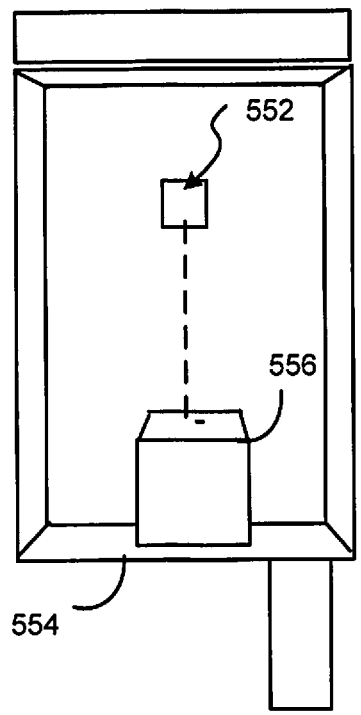
FIG. 5C is a side cutaway view of the interior of a display panel on a surrounding enclosure of an embodiment solar panel system retrofitted public telephones.

FIG. 5C illustrates a cutaway view of the interior of a side panel of a surrounding enclosure of a solar-powered public telephone. A weatherproof case 552 containing the dual-use charge controller 550 may be mounted to the interior of a pedestal or interior of an enclosure panel 554 by adhesive mounting strips (for example, Velcro® strips) attached to the back of the weatherproof plastic case 552. Such mounting strips may provide a secure and quick mounting system that does not require the use of screws, bolts or other traditional hardware. One or more rechargeable battery units 556 may also be provided within the interior of the enclosure panel 554, along with LED lighting (not shown).

The solar power system may be used to retrofit a wireless public telephone to provide for a solar power source outside of the normal electrical grid. However, the majority of public telephones are traditional landline telephones. In another embodiment, retrofitting a public telephone may include converting the phone from a conventional landline telephone to wireless telecommunications in addition to providing solar power. In an embodiment, the copper pair of wires for the land line may be disconnected from the circuit board of a conventional public telephone, and may be replaced with a two-wire RJ11 cable. A RJ11 modular connector on an opposite end of the cable may be plugged into a RJ11 telephone jack on the wireless unit (e.g., on the transceiver) in the pedestal.

Figure 6:
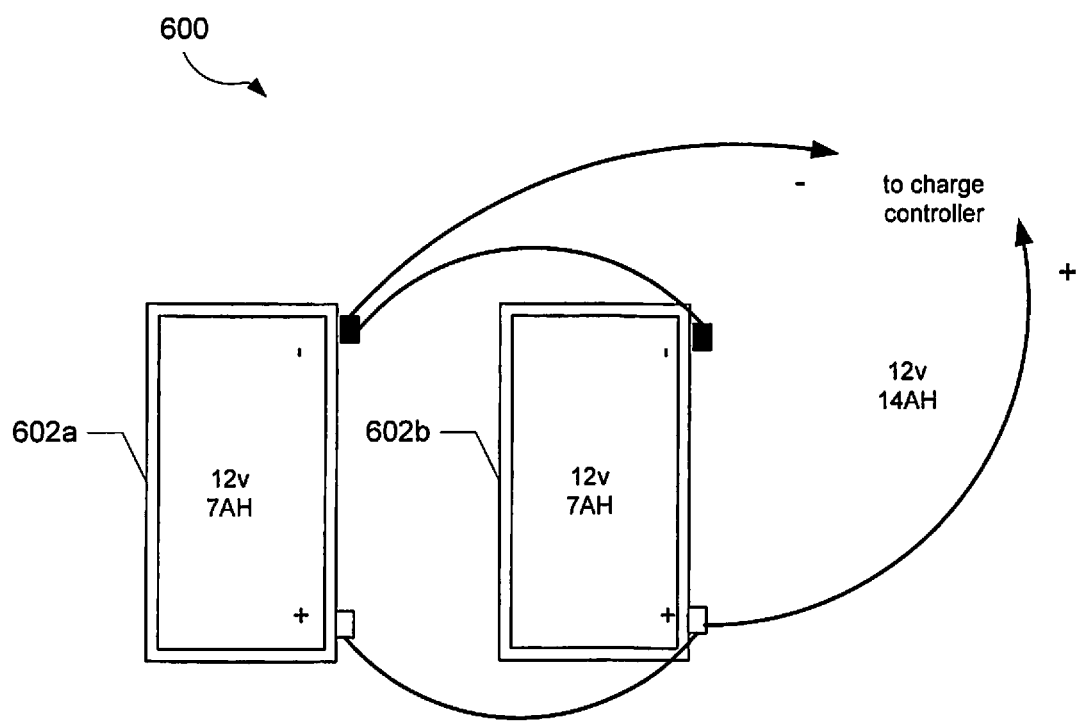
FIG. 6 is a component block diagram of a battery configuration in an embodiment solar panel system retrofitted public telephone.

The battery unit may include one or more rechargeable batteries. FIG. 6 illustrates an example battery unit 600 in an embodiment solar-powered public telephone. The battery unit 600 may be two 12-volt 7-ampere-hour (AH) sealed lead acid (SLA) rechargeable batteries 602a, 602b. The batteries 602a, 602b may be wired in parallel to raise the battery unit 600 from 7 to 14 AH, with the system remaining at 12 volts. The batteries 602a, 602b may be mounted to the inside of the pedestal with mounting brackets. For example, mounting brackets may be 2×3 inch aluminum pieces that are customized to the width of the inside of the pedestal. The mounting brackets may have pre-drilled mounting holes, and may be attached to the interior of the pedestal using any suitable fastener (e.g., nuts and bolts, screws, etc.).

The embodiments described above may be implemented in any of a variety of telephone types, including, but not limited to, public pay telephones, private fixed-line telephones, etc. The foregoing method descriptions are provided merely as illustrative examples and are not intended to require or imply that the processes of the various embodiments must be performed in the order presented. Skilled artisans may implement the described functionality in varying ways for each particular telephone, but such implementation decisions should not be interpreted as causing a departure from the scope of the present invention. Words such as "thereafter," "then," "next," etc. are not intended to limit the order of the processes; these words are simply used to guide the reader through the description of the methods. Further, any reference to claim elements in the singular, for example, using the articles "a," "an" or "the" is not to be construed as limiting the element to the singular.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein, and instead the claims should be accorded the widest scope consistent with the principles and novel features disclosed herein.

What is claimed is:

1. A method of retrofitting a solar panel system to provide power to a public telephone that includes at least one telephone component comprising a handset, the method comprising:
    mounting a charge controller and a wireless unit in a pedestal of the public telephone, wherein the wireless unit is coupled to the charge controller and configured to access a wireless communications network;
    disconnecting a telephone landline from a line interface within circuitry of the public telephone;
    connecting a first end of a two-wire modular connector to the line interface and a second end of the two-wire modular connector to the wireless unit, wherein the public telephone is converted to enable wireless telecommunications through operation of the handset;
    attaching a solar panel to an outer surface of a surrounding enclosure that houses the public telephone, wherein the solar panel is configured to be substantially flat against the outer surface; and
    connecting the solar panel to existing wiring in the pedestal of the public telephone and to the charge controller coupled to the wireless unit, wherein the at least one telephone component is powered using energy output from the solar panel without requiring an additional power source,
    wherein the public telephone retrofitted with the solar panel system operates on the wireless communications network without connection to the telephone landline.

2. The method of claim 1, wherein the pedestal of the public telephone comprises a plurality of pedestals, wherein mounting the charge controller and the wireless unit in the public telephone comprises mounting comprises mounting the charge controller and the wireless unit in at least one of the plurality of pedestals.

3. The method of claim 1, wherein the surrounding enclosure houses a plurality of public telephones.

4. The method of claim 1, wherein the outer surface of the surrounding enclosure comprises a top surface.

5. The method of claim 4, wherein the top surface of the surrounding enclosure is substantially parallel with the ground.

6. The method of claim 4, wherein the solar panel comprises a flexible solar panel, wherein the top surface of the surrounding enclosure is curved, and wherein the flexible solar panel bends to an arc angle of up to around 30 degrees to remain substantially flat against the top surface.

7. The method of claim 1, wherein the battery unit is mounted in the pedestal of the public telephone, and wherein the battery unit comprises two 12 volt, 7 ampere-hour (AH) rechargeable sealed lead acid (SLA) batteries connected in parallel.

8. The method of claim 1, wherein:
    the wireless unit comprises a registered jack, a transceiver, and a UICC on which a subscriber identity module (SIM) is stored; and
    connecting the second end of the two-wire modular connector to the wireless unit comprises connecting the second end of the two-wire modular connector to the registered jack of the wireless unit,
    wherein the method further comprises programming the SIM in the wireless unit to access the wireless communications network by connecting to a cellular network base station.

9. The method of claim 8, wherein the registered jack comprises a RJ11 jack.

10. The method of claim 1, wherein at least one of the pedestal and the surrounding enclosure includes a digital advertising display unit comprising:
    at least one display panel with advertising content;
    a LED lighting system; and
    a network interface configured to allow a remote computer system to control the advertisement content.

11. The method of claim 10, wherein mounting the charge controller in the public telephone comprises mounting dual-use charge controller within a side of the surrounding enclosure, wherein the dual-use charge controller is configured to connect to the wireless unit and the to the LED lighting system.

12. A solar-powered pay telephone, comprising:
    at least one telephone device comprising a handset;
    a surrounding enclosure that houses the at least one telephone device;
    at least one pedestal;
    a solar panel system retrofitted to the at least one telephone device, wherein the solar panel system comprises:
        a solar panel configured attached to an outer surface of the surrounding enclosure, wherein the solar panel is configured to be substantially flat against the outer surface;
        a charge controller, wherein the solar panel is connected to the charge controller via existing wiring in the pedestal; and
        a battery unit coupled to the charge controller; and
    a wireless unit mounted in the pedestal and connected to the charge controller, wherein the wireless unit is configured to access a wireless communications network, and wherein:

a telephone landline is disconnected from a line interface within circuitry of the at least one telephone device; and a first end of a two-wire modular connector is connected to the line interface and a second end of the two-wire modular connector is connected to the wireless unit, wherein the at least one telephone device is converted to enable wireless telecommunications through operation of the handset, wherein the solar panel system is configured to power a the at least one telephone device without requiring an additional power source, wherein the at least one telephone device retrofitted with the solar panel system operates on the wireless communications network without connection to the telephone landline.

13. The solar-powered pay telephone of claim 12, wherein the at least one pedestal comprises a plurality of pedestals, and wherein mounting the charge controller and the wireless unit in the public telephone comprises mounting the charge controller and the wireless unit in each of the plurality of pedestals.

14. The solar-powered pay telephone of claim 12, wherein the at least one telephone device comprises a plurality of telephone devices, and wherein the surrounding enclosure houses a plurality of telephone devices.

15. The solar-powered pay telephone of claim 12, wherein the outer surface of the surrounding enclosure is a top surface.

16. The solar-powered pay telephone of claim 15, wherein the top surface of the surrounding enclosure is substantially parallel with the ground.

17. The solar-powered pay telephone of claim 15, wherein the solar panel comprises a flexible solar panel, wherein the top surface of the surrounding enclosure is curved, wherein the flexible solar panel bends to an angle up to around 30 degrees to remain substantially flat against the outer surface.

18. The solar-powered pay telephone of claim 12, wherein the battery unit comprises two 12 volt, 7 ampere-hour (AH) rechargeable sealed lead acid (SLA) batteries connected in parallel.

19. The solar-powered pay telephone of claim 12, wherein:
the wireless unit comprises a registered jack, a transceiver, and a UICC on which a subscriber identity module (SIM) is stored; and
the second end of the modular connector is plugged into the registered jack in the wireless unit.

20. The solar-powered pay telephone of claim 19, wherein the registered jack comprises a RJ11 jack.

21. The solar-powered pay telephone of claim 12, wherein at least one of the pedestal and the surrounding enclosure includes a digital advertising display unit comprising:
at least one display panel with advertising content;
a LED) lighting system; and
a network interface configured to allow remote computer system to control to the advertisement content.

22. The solar-powered pay telephone of claim 21, wherein the charge controller comprises a dual-use charge controller mounted within a side of the surrounding enclosure, and wherein the dual-use charge controller is configured to connect to the wireless unit and the to the LED lighting system.

* * * * *